UNITED STATES PATENT OFFICE.

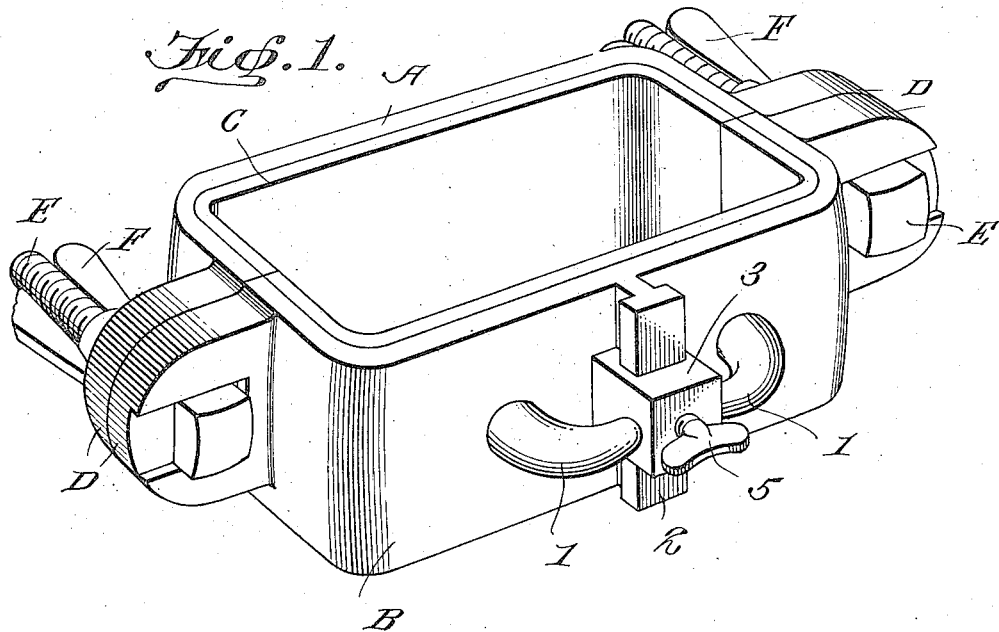
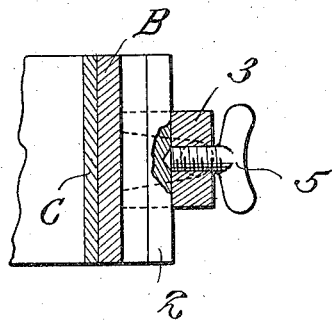
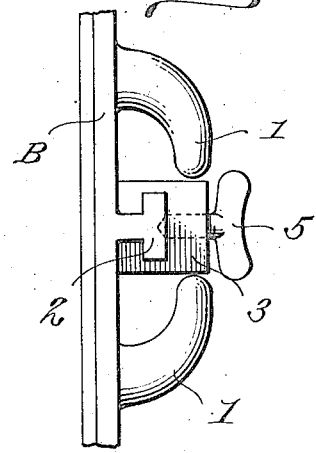
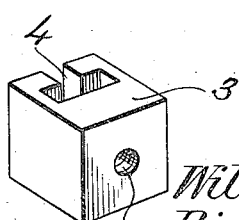

WILLIAM H. McLAUGHLIN, OF HARTFORD, CONNECTICUT, AND RICHARD E. BABCOCK, OF BARCROFT, VIRGINIA, ASSIGNORS, BY DIRECT AND MESNE ASSIGNMENTS, TO CASSIUS S. CHASE, OF HARTFORD, CONNECTICUT.

CONNECTING DEVICE.

1,260,420.   Specification of Letters Patent.   Patented Mar. 26, 1918.

Application filed August 30, 1917. Serial No. 189,007.

*To all whom it may concern:*

Be it known that we, WILLIAM H. McLAUGHLIN and RICHARD E. BABCOCK, citizens of the United States, residing, respectively, at Hartford, in the county of Hartford and State of Connecticut, and at Barcroft, in the county of Alexandria and State of Virginia, have invented certain new and useful Improvements in Connecting Devices, of which the following is a specification.

This invention relates to clamps, more particularly to one of the plates or members of a two-plate clamp, and resides especially in the means for readily securing thereto or therein the links of a chain or part or parts of some element or elements, and in provision for locking said means in position.

The invention hereinafter set forth and described is in the form of a clamp and is intended primarily by applicants for use in attaching anti-skidding chains, of the fixed point type, to the spokes of an automobile truck wheel. However, the invention may be embodied in a number of other different forms of plates to be fixed in position in various manners. Likewise, while primarily intended for use with anti-skidding devices, as above mentioned, it can be used equally well for a great variety of purposes.

The object of the present invention is to provide a plate with two hooks or projections to receive the links of a chain and a coöperating sliding keeper or guard adapted to be locked in position between the adjacent ends of said hooks to close the opening between said hooks against the egress or ingress of said chain links to prevent the removal from, or application to, said hooks of a chain link when said keeper or guard is in normal position.

Further objects are to provide a simple construction whereby said keeper may be mounted on said plate, have sliding or reciprocatory movement transversely of said hooks and be easily, quickly and securely locked in normal position.

Further objects are to reduce the cost of manufacture, simplify the construction and increase the reliability and durability of such articles, all of which objects are accomplished by the construction, combination and arrangement of parts all as hereinafter more particularly set forth and described.

In the accompanying drawings, in which only the preferred form is shown:

Figure 1 represents a perspective view of a clamp embodying our invention;

Fig. 2, a cross-sectional view through plate B of the clamp, showing the T-rib and locking screw in side elevation, one of the hooks being indicated in dotted lines;

Fig. 3, a top plan view of plate B, broken away; and

Fig. 4, a detail perspective view of the slide, keeper or guard.

Referring now in detail to the drawings, A and B indicate the respective clamp plates having a rubber treated lining C and provided with perforated end flanges D for the reception of bolts E on which wing nuts F are screwed to draw the two plates toward each other on some intervening object.

All of the parts as thus far described are old and well known.

The plate B is provided with two hooks 1 presented toward and in line with each other and preferably, though not necessarily, integral with said plate. The adjacent ends of the hooks 1 are at an interval from each other, leaving an opening, to allow the ready application and removal of chain links to and from said hooks.

Preferably formed integral with said plate B is a T-shaped rib 2 running transversely of, and between, said hooks.

A guard block or slide 3, having a slot 4 corresponding in shape to rib 2 and adapted to receive the same, is adapted to be moved along said rib and is of such shape and dimensions as to close the space between said hooks 1 against the egress and ingress of chain links and other analogous articles when said block is in proper or normal position between the adjacent ends of said hooks 1.

A thumb-screw 5, working through an internally screw-threaded hole or bore 6 in said block 3, has a conical end which is received by a similarly shaped recess in the top of rib 2 when the block 3 is in normal position and locked in such position by screw 5.

This conical recess, of course, may be dispensed with and the end of the screw may be made of any desired shape.

Of course the plate B may be made of any desired suitable shape and secured in position, if desired, in any suitable manner and is capable of use in a wide range of arts.

Any suitable materials may be used for any parts.

Having thus described our invention, what we claim as new and desire to secure by Letters Patent is:

1. A plate provided with two hooks presented substantially toward each other and having an opening between their adjacent ends, in combination with a slidably mounted keeper adapted to be moved between the adjacent ends of said hooks to guard said opening against the egress or ingress of an endless article, and means for locking said keeper in normal position.

2. A plate provided with two hooks presented substantially toward each other and having an interval between their adjacent ends, in combination with a guard slidably mounted with relation to said hooks and adapted to be moved into said interval, and means for locking said guard in such position.

3. A plate having two hooks with their free ends arranged adjacent to each other, in combination with a guard slidably mounted with relation to said hooks and adapted to be moved into a position adjacent the ends of both hooks to prevent the application or removal of a chain link to or from either of said hooks, and means for locking said guard in such position.

4. A plate having two hooks with their free ends arranged adjacent to each other, in combination with a guard slidably mounted on said plate and adapted to be moved into a position adjacent the ends of both hooks to prevent the application or removal of a chain link to or from either of said hooks and screw-threaded means for locking said guard in normal position.

5. A plate having two hooks with their free ends arranged adjacent to each other and provided with a transverse headed rib, in combination with a guard having a slot receiving said rib, said guard being adapted to be moved on said rib into a position adjacent the ends of both hooks to prevent the application or removal of a chain link to or from either of said hooks, and means working through said guard and adapted to engage said rib to lock said guard in position on said rib.

6. A plate having two integral hooks with their free ends arranged adjacent to each other and provided with an integral headed rib, in combination with a guard traveling on said rib and adapted to be moved into a position adjacent the ends of both hooks to prevent the application or removal of a chain link to or from either of said hooks, and means working through said guard to engage said rib to lock said guard in any desired position on said rib.

WILLIAM H. McLAUGHLIN.
RICHARD E. BABCOCK.

Copies of this patent may be obtained for five cents each, by addressing the "Commissioner of Patents, Washington, D. C."